United States Patent
Dreiss et al.

(10) Patent No.: US 11,396,887 B2
(45) Date of Patent: Jul. 26, 2022

(54) ROTATING DIFFUSER PUMP

(71) Applicants: Flowserve Management Company, Irving, TX (US); Andreas Dreiss, Hamburg (DE); Rehan Farooqi, San Marino, CA (US); Stefano Tosin, Braunschweig (DE); Jens Friedrichs, Schwulper (DE)

(72) Inventors: Andreas Dreiss, Hamburg (DE); Rehan Farooqi, San Marino, CA (US); Stefano Tosin, Braunschweig (DE); Jens Friedrichs, Schwulper (DE)

(73) Assignee: Flowserve Management Company, Irving, TX (US)

( * ) Notice: Subject to any disclaimer, the term of this patent is extended or adjusted under 35 U.S.C. 154(b) by 749 days.

(21) Appl. No.: 15/101,460

(22) PCT Filed: Dec. 3, 2014

(86) PCT No.: PCT/US2014/068306
§ 371 (c)(1),
(2) Date: Jun. 3, 2016

(87) PCT Pub. No.: WO2015/084926
PCT Pub. Date: Jun. 11, 2015

(65) Prior Publication Data
US 2016/0305447 A1    Oct. 20, 2016

Related U.S. Application Data

(60) Provisional application No. 61/911,269, filed on Dec. 3, 2013.

(51) Int. Cl.
*F04D 29/44*    (2006.01)
*F04D 29/42*    (2006.01)
(Continued)

(52) U.S. Cl.
CPC ............ *F04D 29/447* (2013.01); *F04D 1/003* (2013.01); *F04D 29/2277* (2013.01);
(Continued)

(58) Field of Classification Search
CPC .... F04D 29/447; F04D 29/442; F04D 29/444; F04D 1/003
See application file for complete search history.

(56) References Cited

U.S. PATENT DOCUMENTS

| 4,830,584 A | 5/1989 | Mohn | |
| 5,580,214 A * | 12/1996 | Mohn | F04D 1/00 |
| | | | 415/169.2 |

(Continued)

FOREIGN PATENT DOCUMENTS

| DE | 1110810 B * | 7/1961 | ........... F04D 17/127 |
| EP | 0348342 A1 | 12/1989 | |

(Continued)

OTHER PUBLICATIONS

McNally Institute, "Specific Speed", published Jan. 12, 2008 (Year: 2008).*

(Continued)

*Primary Examiner* — Justin D Seabe
(74) *Attorney, Agent, or Firm* — Dinsmore & Shohl LLP (57) ABSTRACT

A centrifugal pump with a rotating impeller and a rotating diffuser. The diffuser may be rotated with a controlled speed to broaden the operational range of the pump. Such control may be done independently of the rotational speed of the impeller to tailor pump operation to a particular NPSH, efficiency, fluid flow or related requirement. In one preferred form, the impeller and diffuser are made to counter-rotate relative to one another, while the independent rotational speed of each may be provided by one or more motors, as well as a variable-speed transmission coupled to such motor (Continued)

or motors. Such a pump is optimized for specific speed operating ranges beneath those associated with axial flow pump configurations.

16 Claims, 4 Drawing Sheets

(51) Int. Cl.
    *H02K 7/14*     (2006.01)
    *H02K 16/00*     (2006.01)
    *F04D 1/00*     (2006.01)
    *F04D 29/22*     (2006.01)
    *F04D 29/66*     (2006.01)
    *F04D 13/06*     (2006.01)

(52) U.S. Cl.
    CPC ......... *F04D 29/426* (2013.01); *F04D 29/669* (2013.01); *H02K 7/14* (2013.01); *H02K 16/005* (2013.01); *F04D 13/06* (2013.01)

(56) References Cited

U.S. PATENT DOCUMENTS

| | | |
|---|---|---|
| 6,433,451 B1 | 8/2002 | Cherciu |
| 6,776,584 B2* | 8/2004 | Sabini ................ F04D 15/0088 415/1 |
| 7,030,528 B2* | 4/2006 | Morgante ............. H02K 16/02 310/112 |
| 9,097,258 B2* | 8/2015 | Hofer .................... F04D 17/127 |
| 2002/0119038 A1 | 8/2002 | Abdallah |
| 2011/0048046 A1 | 3/2011 | Sommer et al. |
| 2016/0222968 A1* | 8/2016 | Clements ............. F04D 13/028 |

FOREIGN PATENT DOCUMENTS

| | | |
|---|---|---|
| EP | 2 466 142 A2 | 6/2012 |
| WO | WO 89/08191 | 8/1989 |
| WO | WO 02/068826 A2 | 9/2002 |
| WO | 2013/092982 A1 | 6/2013 |

OTHER PUBLICATIONS

Extended European Search Report dated Jul. 18, 2017 for EPO Application No. 1486207.3 entitled "Rotating Diffuser Pump".

International Search Report pertaining to PCT/US2014/068306 with a filing date of Dec. 3, 2014.

Written Opinion pertaining to PCT/US2014/068306 with a filing date of Dec. 3, 2014.

* cited by examiner

ROTATING DIFFUSER PUMP

This application claims priority to U.S. Provisional Application 61/911,269, filed Dec. 3, 2013.

BACKGROUND OF THE INVENTION

The present invention relates generally to pumps, and more particularly to a centrifugal pump with a rotating diffuser.

Pump impellers and diffusers are well known components that cooperate with one another in rotating turbomachinery to impart energy to a working fluid. In one conventional pump form, the impeller rotates to increase the kinetic energy of the axially-received fluid, while the diffuser (often in the form of an array of vanes) remains stationary and radially outward of the impeller to convert the kinetic energy into pressure energy. Such a pump configuration (typically referred to as a centrifugal pump) is designed to operate best at one set of conditions (called best efficiency point (BEP)) at any given speed.

Regardless of the configuration, one measure of a pump's capability is referred to generally as the net positive suction head (NPSH), and more particularly as net positive suction head required ($NPSH_R$). Significantly, this is an important indicator of a pump's ability to avoid the destructive effects of cavitation, and running a pump at as low of an $NPSH_R$ as possible without running into cavitation problems is desirable in that it avoids the costs and complexities associated with an overdesigned system.

Conventional forms of centrifugal pumps—with their fixed speed on the impeller, diffuser or both—are able to achieve higher head and power densities, improved $NPSH_R$ characteristics or the like while avoiding cavitation, but do so through significant increases in pump complexity and cost, as well as limits in operational range. All of these conditions lead to less than optimum pump operation, as the equilibrium speeds associated with the rotating diffusers are mismatched relative to the needs of the pump for efficient, cavitation-free operation.

Improvements in $NPSH_R$ and related performance may be realized by allowing the diffuser to rotate. In one form, permitting the diffuser to rotate in response to movement in the impeller allows the shear forces inside and outside of the rotating diffuser to establish an equilibrium speed to improve the efficiency of the overall impeller/diffuser stage combination. The shortcoming of such a configuration is that the co-rotational movement of the impeller and diffuser limits the amount of pressure rise that can be produced in the single impeller/diffuser stage. In another form (known as a cascaded, or free spool configuration), the rotating diffuser may be mechanically coupled with a rotating inducer member placed axially and fluidly upstream of the impeller. These configurations tend to have complex bearing arrangements that limit the applicability to low power pump configurations. In yet another form, a geared mechanism can be used to couple both the impeller and diffuser to a fixed speed motor. Such an arrangement limits the increased pressure rise produced by the pump to a discrete range of operating conditions.

Axial turbomachinery (such as that used in aircraft and marine applications) has employed counter-rotating impellers with no diffuser or collector placed in-between as a way to increase system performance. Nevertheless, such axial flow devices are not suitable for use where mixed flow or radial flow centrifugal pumps are needed, as axial flow machines are configured for low pressure rise (i.e., low head), high flow fluids in gaseous form. As such, the axial-flow turbomachine is not suitable for pumping applications where the pressure rise is such that the specific speed ($N_S$)—as conventionally defined—only attains very low values. By way of example (using English units), typical axial flow turbomachinery operates in specific speed ranges of between about 7,000 and 20,000, while centrifugal flow and mixed flow turbomachinery ranges are between about 500 and 10,000 and 2,000 and 8,000, respectively. As such, the present inventors are unaware of the use of counter-rotating pump stages below specific speeds of below about 7,000. What is needed is a centrifugal pump with a diffuser that is configured to counter-rotate relative to its companion impeller as a way to improve pump operability in the specific speed ranges typically encountered by such pumps.

SUMMARY OF THE INVENTION

According to one aspect of the present invention, a centrifugal pump with a rotating diffuser is disclosed. Significantly, the diffuser is neither stationary, rotating completely decoupled from the impeller nor rotatably coupled to the impeller for a fixed rotational speed between them, but instead can be rotated with a controlled speed to act as a second impeller or related rotor. In one form, this controlled speed rotation is produced by one or more motors coupled to the pump. Furthermore, a variable speed drive, transmission or the like may be coupled to the motor (or motors) to allow for a wider range of pump operating conditions. In still another form, only one of the impeller and diffuser (either of which are now the functional equivalent of a rotor) may be made to have variable speed.

By rotating the diffuser in the manner described below, additional energy is imparted to the fluid, thereby increasing the power density and head generated while doing so within the same housing or related physical space. Moreover, the impeller can be designed to operate at lower speeds than would be required in a stationary diffuser configuration, thus enabling the same head to be generated at much lower $NPSH_R$ values. Furthermore, by improving the head and power densities, the present invention allows broad flow operating ranges, increases in pump power/weight ratio and extends the peak efficiency performance range.

According to another aspect of the present invention, an assembly made up of a centrifugal pump and a pump-driving motor. The motor helps achieve controlled speed rotation of the pump impeller and diffuser. In one configuration, the motor or motors may be coupled with a variable speed drive, transmission or the like to impart variable speed to one or both of the rotating diffuser and impeller.

According to yet another aspect of the present invention, a method of pumping a fluid is disclosed. The method includes operating a centrifugal pump such that the diffuser may rotate with—but independently from—the impeller. More particularly, the diffuser may be rotated with a controlled speed to broaden the operational range of the pump. In this way, the relative rotational speeds between the impeller and diffuser may be tailored to a particular $NPSH_R$ requirement. The pump of the present invention (and its attendant method of operation) is especially useful to fulfill fluid pumping operations where varying operating conditions, extremely high efficiency levels and low $NPSH_R$ levels or changing Q-H characteristics are paramount.

BRIEF DESCRIPTION OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
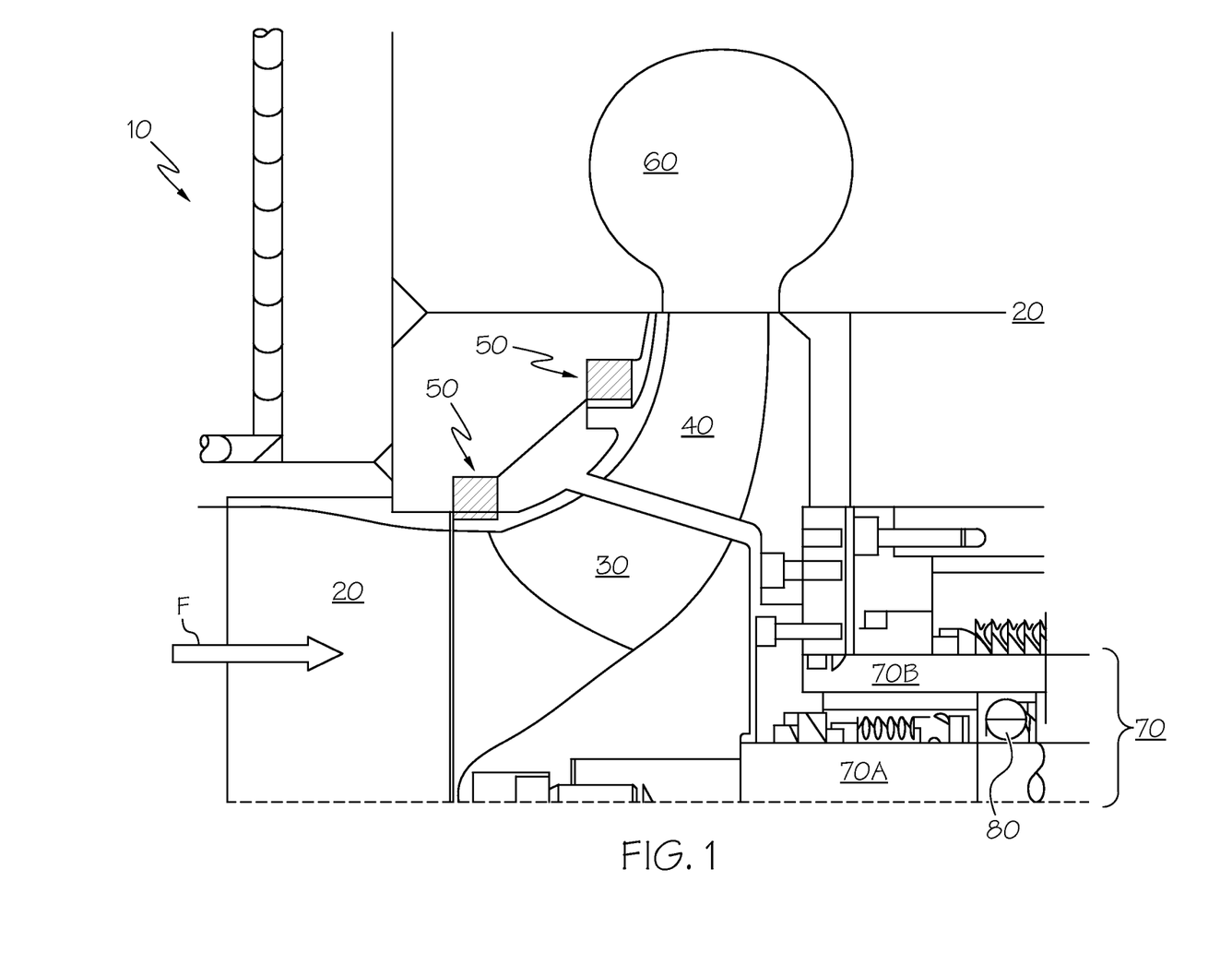
FIG. 1 is a cutaway view of a pump highlighting the location of various components therein, including rotating impeller and diffuser components according to an embodiment of the present invention.

Referring first to FIG. 1, a cutaway view of a centrifugal pump 10 according to the present invention is shown. In it, a fluid F to be pumped enters the stationary inlet that is formed in a housing or related enclosure 20 and then on to impeller 30 (which acts as a first rotor). Diffuser 40—which is fluidly downstream of impeller 30—rotates as well (making it act as a second rotor). Seals 50 are mounted to secure locations within housing 20 to help contain fluid F and reduce cross-contamination between it and a lubricating fluid (not shown). A radially-outward volute 60 acts as a stationary scroll-based collector of the pumped fluid F that is discharged from the impeller 30 and diffuser 40. A shaft 70 includes two concentrically-arranged drive shaft portions 70A (for impeller 30) and 70B (for the rotating diffuser 40) that can rotate relative to one another about bearing 80 that is disposed between the shaft portions 70A and 70B. In the present context, while the pump housing 20 may be associated predominantly with the casing formed around the inlet, outlet and fluid F flowpath, as well as defining integral or connectable footers and other structural hardware, it will be understood that additional covers, casing or related containment structure may also be included. For example, inlet and outlet flanges form mounting locations to fluidly connect the respective inlet and outlet of pump housing 20 to corresponding conduit (not shown), and may include apertures formed therein to receive screws, bolts or related fasteners that can be used to facilitate such connection.

Figure 3A:
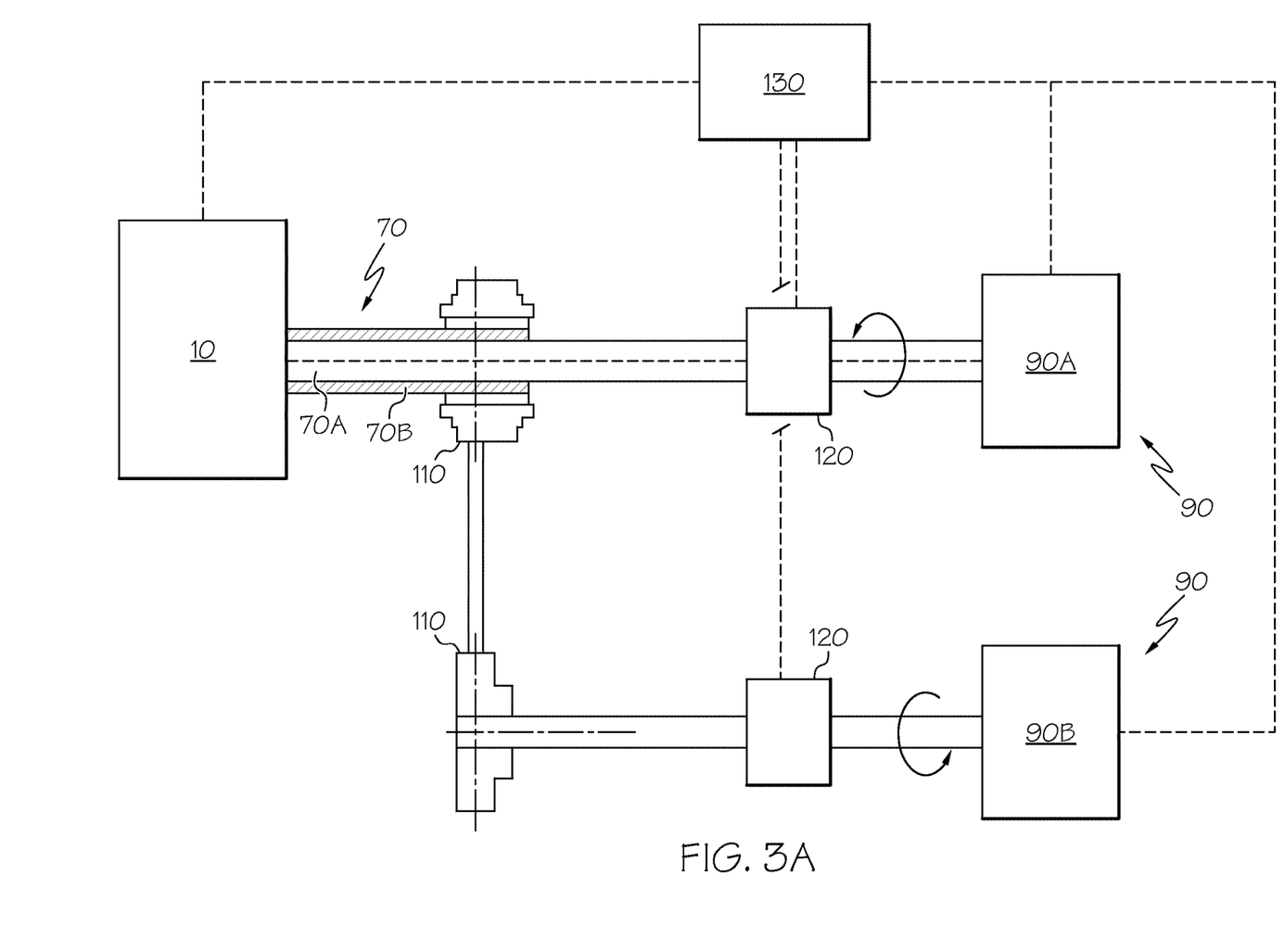
FIG. 3A is a simplified cutaway view of the pump of FIG. 1 being driven by a dual motor-clutch configuration.
Figure 3B:
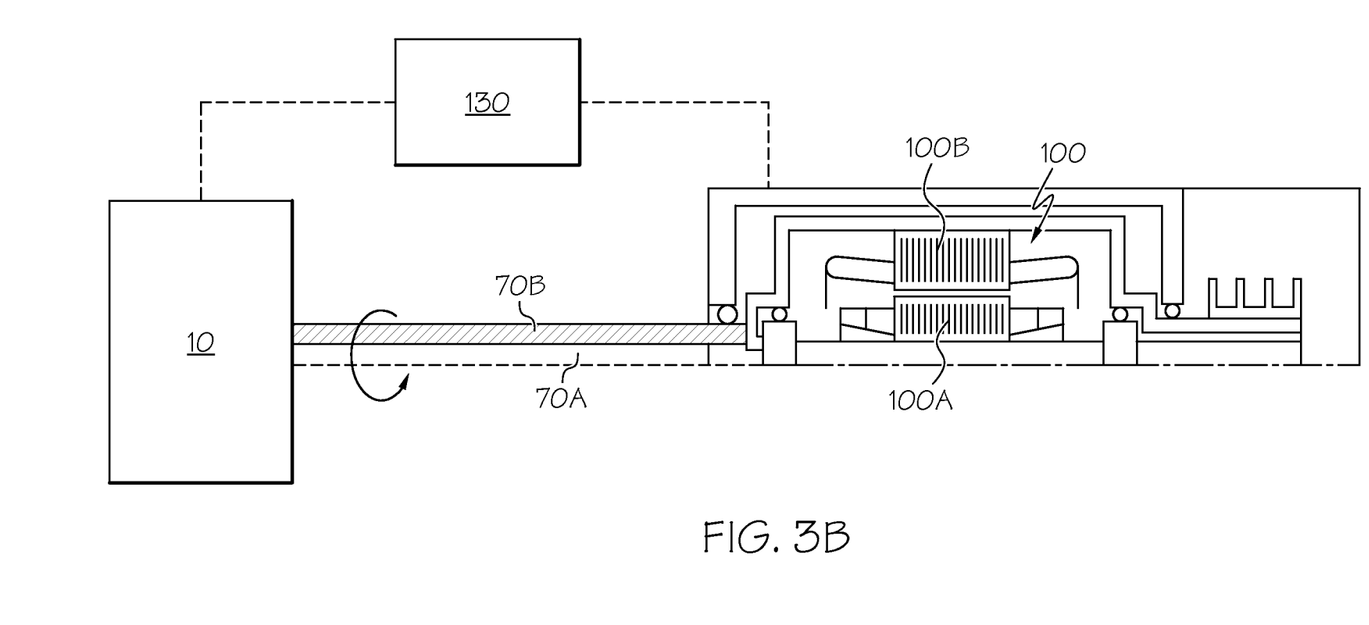
FIG. 3B is a simplified cutaway view of the pump of FIG. 1 being driven by a single motor with a concentric hollow shaft.

Referring next to FIGS. 3A and 3B, the rotational movement imparted to the impeller 30 and diffuser 40 through shaft portions 70A and 70B can be through the operation of a dual motor 90 (FIG. 3A) or a single concentric-shaft motor 100 (FIG. 3B). In either case, the movement imparted to the shaft portions 70A and 70B is preferably of a counter-rotational variety, while the motors 90, 100 are of the alternating current (AC) induction type, where a rotating armature (rotor) is surrounded by a coil-wound stationary field (stator, not shown). As is understood by those skilled in the art, when electric current (not shown) is passed through the stator windings, a part of the stator known as the pole (which may be made up of a magnetically permeable material, such as iron) around which the windings are wrapped becomes magnetically energized, which in turn imparts an electromagnetic force to the rotor, causing it (as well as the coupled shaft 70) to rotate. Suitable gearing (for example, bevel gears 110) may be used to provide independent coupling of the motors 90 (shown with particularity in FIG. 3A as 90A and 90B) to a respective one of the impeller 30 and diffuser 40, and moreover to permit them to counter-rotate about the shaft 70 axis. Moreover, the rotational speed with which the shaft portions 70A, 70B move about the shaft 70 axis may be independently varied through transmissions 120. Referring with particularity to FIG. 3B, in another form, single motor 100 may comprise concentric rotor configurations 100A, 100B to promote the coupling to the shaft portions 70A and 70B.

Regardless the drive system is configured as two separate motors 90 (FIG. 3A) or a single dual-rotor motor 100 (FIG. 3B), the rotor's laminated steel plates (not shown) carry magnetic flux that induces electrical current in a squirrel cage or related structure. The induced magnetic field in the rotor interacts with the offset magnetic field in the stator, and leads to rotation and the generation of torque. Likewise, wiring is formed as part of the stator and is connected to a voltage source to produce a rotating magnetic field. With particular regard to the concentric rotor configuration of FIG. 3B, the configuration of the rotor and stator windings may be varied such that the coupled shaft portions 70A, 70B may be independently controlled, including in which direction (i.e., clockwise or counterclockwise) they rotate, thereby providing the desired rotation of the respective impeller 30 and diffuser 40.

The present inventors are aware that the nature of the flowpath in axial, mixed-flow and centrifugal machines exists along a continuum, with axial flow occupying one end of the spectrum and centrifugal flow at the opposing end. Within this understanding, in the present context, the terms "centrifugal pump", "centrifugal compressor" or the like is meant to include pump or compressor configurations that may also embody some mixed-flow attributes, so long as they chiefly rely upon the movement of the fluid being pumped as it leaves a particular pump stage in a substantially (if not entirely) radial outward direction. As such, an impeller with significant mixed-flow attributes is encompassed by the present invention in situations where the diffuser to which it is coupled provides the necessary radially outward flow component.

In a preferred form, the pump 10 design target has a specific speed $N_S$ from about 200 to 6,000 US or English units (where shaft speed is in revolutions per minute (rpm), the flowrate of the pump 10 at its BEP point is in gallons per minute (gpm), and the head is measured in feet). As is understood by those skilled in the art, one measure of specific speed $N_s$ is the ability of the pump 10 to avoid cavitation problems associated with low $NPSH_R$ values. In one form, specific speed $N_S$ is expressed by the following formula:

$$N_S = \frac{n\sqrt{Q}}{(gH)^{3/4}}$$

where the specific speed $N_S$ is unitless, the pump 10 rotational speed n is in revolutions per minute, Q is the flowrate in gpm at the BEP, g is the acceleration due to gravity in feet per second squared and H is the total head at the BEP.

Although shown in single-stage form, pump 10 may also include multistage variants, and may have single suction or double suction design, as well as overhung or between bearing configurations. Preferred uses for pump 10 include chemical processing, oil production (including water injection), oil refining, pipeline (oil, water and other fluids), power plants (fossil, nuclear, combined cycles, cogeneration or the like), water industry, mining industry and biological and pharmaceutical industry applications. Moreover, pump 10 may be configured to accept single- and multi-phase fluids (such as those with air or other gases, as well as solids).

Figure 2:
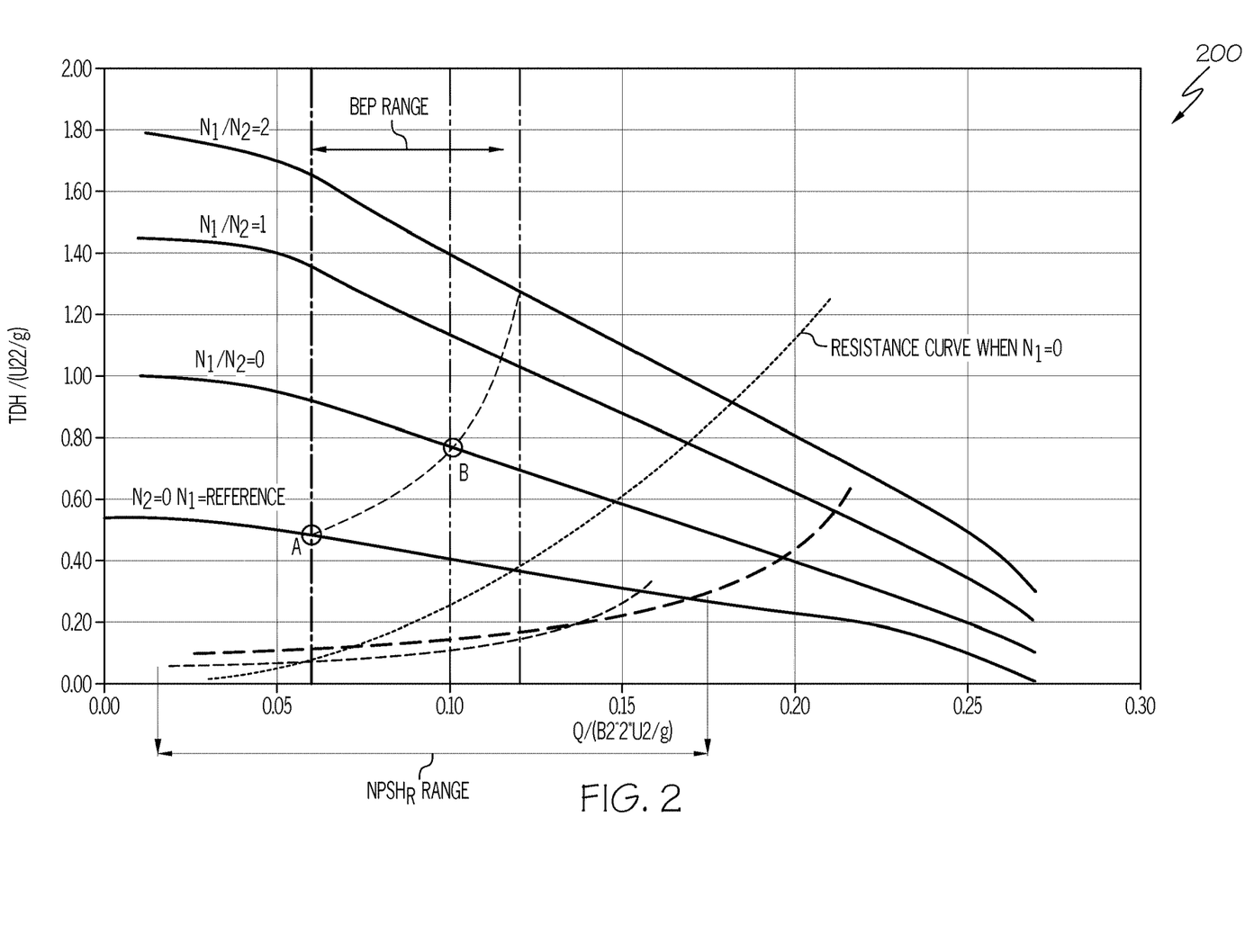
FIG. 2 is a graph showing head and NPSH values versus flow characteristics of the pump of FIG. 1.

Referring next to FIG. 2 in conjunction with FIGS. 3A and 3B, a significant part of the invention (especially for its use in variable speed applications) is the control system 130 which, based on the design and test data (such as that depicted on curve 200) of the pump 10, would have the capability to calculate the best combination of speeds to either achieve best efficiency operation for the operating conditions or best $NPSH_R$ performance for suction conditions available. In one form, the controller 130 may be in the form of a programmable logic controller (PLC) and include digital processing capabilities designed (through appropriate interfaces) to receive input signals and generate output control signals through a central processing unit (CPU). Such a controller 130 may also include a computer-readable medium having stored computer-executable instructions thereon; such medium may also serve as read-only memory (ROM) for storing a program which controls the operation of the overall apparatus and a random-access memory (RAM) having a data storage area. In one form, the CPU may be connected to an input/output interface. As will be further appreciated, such a controller 130 may form part of a larger computer-based control system (not shown) that can be used to communicate and control the operation of various pumps 10 or larger system components. Thus, in one form, the controller 130 may include one or more modules to perform the functionality indicated. As used herein, the term "module" refers to an application specific integrated circuit (ASIC), an electronic circuit, a processor (shared, dedicated or group) and memory that executes one or more software or firmware programs, a combinational logic circuit, or other suitable components that provide the desired functionality. In one non-limiting example, data corresponding to pump 10 operation (such as curve 200, as well as an impeller or compressor map or the like) may be stored in controller 130 memory as a lookup table, data structure or other suitable means to allow the controller 130 to determine where the operating state of the pump 10 or motors 90, 100 is in relation to an optimum condition. Such data may be preloaded into the controller 130 using information provided by, for example, the pump manufacturer, or built up using a diagnostic routine that varies the operation of the pump 10 and detects certain operational conditions.

The benefits of using a variable speed mechanism to control the relative speeds of the impeller 30 and diffuser 40 according to an aspect of the present invention are shown in the form of a graph or curve 200 that depicts a performance metric (in particular, a normalized head or efficiency) versus pump capacity or flow. As shown, the head and flow characteristic curve 200 of the pump 10 can be made non-dimensional with respect to a reference speed and reference dimensions; in this way, the same curve 200 can be applicable to geometrically similar machines at all speeds. These non-dimensional characteristics represent a non-dimensional head or pressure rise along the Y-axis, while the X-axis represents the non-dimensional flow. The second part of Y-axis represents the non-dimensional $NPSH_R$ of the pump, while points A and B represent the BEP for the first rotor (i.e., impeller 30) and second rotor (i.e., diffuser 40) if they were a conventional turbo-machine, where the BEP is represented by a maximum of two points on the non-dimensional domain. For the pump 10 of the present invention, the operation follows the line marked "Locus of BEP Range" between points A and B on the non-dimensional space, and therefore permits great flexibility to adapt to different operating conditions. The non-dimensional $NPSH_R$ characteristics are also shown to illustrate the flexibility of designing or operating the same pump 10 for a wide range of NPSH conditions. In another embodiment, it is possible to apply the present invention to multistage pumps (not shown); in such a configuration, the impellers (similar to impeller 30) may be mounted on a single shaft (similar to shaft 70) and operated at the same speed while the diffusers (similar to diffuser 40) can be rotated via separate common system in the manner discussed above.

In summary, a pump 10 according to the present invention can be operated such that the diffuser 40 can be made to rotate independently of impeller 30; this would broaden the peak of the BEP curve as compared to a conventional pump. In a more particular scenario, the diffuser 40 can be operated under a fixed resistance (such as torque imposed by transmission 120); thus, it would be stationery until the pressure difference across the vanes of the diffuser 40 exceeds a prescribed limit, after which diffuser 40 starts to rotate. Such a configuration will also limit runaway situations to avoid having the rotating diffuser 40 go beyond its mechanical limits. In any event, by placing the impeller 30 and diffuser 40 in variable speed counter-rotation relative to one another; the benefit of high head and power density in a single pump is preserved, as well as the ability to allow wide head and flow operating ranges and corresponding $NPSH_R$ flexibility. In a variation, the impeller 30 and diffuser 40 may be placed in fixed speed counter-rotation to one another as a way to achieve high pump power density.

The negative pre-rotation or pre-swirl between the tangential component of the impeller 30 absolute exit velocity and the opposite tangential velocity of diffuser 40 inlet creates an additive term in the Euler's theoretical head value of the diffuser 40. Therefore, the diffuser 40 produces significantly higher head than a single impeller having same exit geometry. The total theoretical head of the pump 10 is the Euler's head generated by first rotor (i.e., impeller 30) plus the high Euler's head generated by the second rotor (i.e., diffuser 40).

An example of the operation of the present system is described next. In the example, the present inventors modeled pump 10 as a one-dimensional design to include several loss models, deviation or slip function, blade loading, power and efficiency calculations. The one-dimensional model demonstrated that the power density coefficient curve has an inflection point and is a function of specific combination of relative rotor speeds. The design example parameters were selected based on the highest power density coefficient and efficiency for the desired rated conditions. Unlike conventional geared systems, the speeds of the first and second shaft portions 70A and 70B (as well as the respective coupled impeller 30 and diffuser 40) can be independently varied; in one study, the present inventors varied the speed range from slightly below 2000 RPM to slightly above 2000 RPM through two separate electric drives; one of which was a hollow shaft motor such as discussed above. The present inventors determined that this arrangement gives significant flexibility in the non-dimensional BEP range of the pump 10, as the BEP is no longer a 'point' in the non-dimensional space but a line (or locus) as a function of relative speed ratio; as discussed above, this is traced out between points A and B in FIG. 2. Some additional extension of flexibility is also possible due to independent variable speed drives.

Optimization of the impeller 30 and diffuser 40 may be achieved using multi-streamline curvature analysis that combines fluid dynamic loss models with a slip or deviation models at the entrance of volute 60. For example, the parameters are calculated in a recursive way for each stream line such that the desired pressure profile across the span of the impeller 30 and diffuser 40 is the convergence criterion. Likewise, numerous hypotheses that are sensitive to the most significant and independent parameters may be optimized via fitness-function optimizer tool; in one non-limiting form, scripting may be achieved in Matlab-Reference-Surface-Optimizer (RSO) that is based on a surface approximation (such as with a Kriging model) to search for local minimums with a gradient method. Such an approach detects optimum specific speed $N_S$ for the impeller 30 and diffuser 40; this in turn maximizes the benefits of the present counter-rotating design compared to a machine with the same design point that employs a conventional rotor with fixed trailing stator design. As mentioned above, pump 10 is preferably configured to operate in a low specific speed $N_S$ range (preferably around 6,000), and more particularly in very low specific speed $N_S$ ranges (preferably between about 200 and 1,000 in one form, between about 1,000 and 2,000 in another form, and between about 2,000 and 3,000 in another form). Assuming steady numerical approximation error, the fitness function of the optimizer tool is based on numerical simulation (CFD) results. The fitness function is a weighted function between total head between first rotor inlet and volute inlet and the corresponding efficiency. The results, indicated by a maximum efficiency region on the fitness function represent a specific combination of rotors' speeds and the pressure ration between them. Optimum geometries were identified and one was chosen for manufacturing and testing in a test rig. Transient CFD analysis was also conducted to determine volute losses and incidence losses between first and second rotor and pressure pulsations generated.

The optimization objective function could be defined in different manner, such as the search for the absolute efficiency maximum or the highest power density or the wider effective working range. One significant attribute of the present pump 10 is the wide flexibility over a range of working conditions. Importantly, it allows for the use of a much smaller pump than would otherwise be required, and in some circumstances would—with proper cooperation of controller 130—relieve the need for a discharge valve (not shown). As indicated above, maps may be included as part of the controller 130 memory (for example, as a lookup table) or generated by a suitably-configured algorithm that can be acted upon by the controller 130 CPU, based on input parameters (such as the rotational speeds of the impeller 30 and diffuser 40). In one form, controller 130 may employ feedback-based approaches, such as using sensors (not shown) to observe actual values of impeller-versus-diffuser speed ratios; such knowledge represents an additional degree of freedom for the pump designer. For example, a set of velocity ratio information may be used to establish pump 10 behavior at the design condition; this information may also be used to improve the performance in off-design conditions.

While certain representative embodiments and details have been shown for purposes of illustrating the invention, it will be apparent to those skilled in the art that various changes may be made without departing from the scope of the invention, which is defined in the appended claims.

The invention claimed is:

1. A single-stage centrifugal pump for a fluid, said pump comprising:
   a housing;
   a single impeller rotatably disposed in said housing such that fluid introduced thereto is centrifugally discharged therefrom to experience a first increase in energy;
   a diffuser rotatably disposed in said housing and placed in radially outward fluid communication with and fluidly downstream of said impeller such that upon passage through said diffuser, said discharged fluid experiences a second increase in energy;
   at least one motor;
   at least one variable speed drive;
   a controller configured to receive data corresponding to operation of said pump and to use such data to calculate a combination of speeds to be imparted to said impeller and said diffuser from said variable speed drive in order to achieve an inlet condition for said pump that can provide an optimized specific speed of said pump between 200 and 6000 based on a combination of a best efficiency point and a best net positive suction head required that is selected from a pump characteristic curve in order to adapt to independent rotational movements of said impeller and said diffuser; and
   a shaft comprising two-concentrically-arranged drive shaft portions such that upon receipt of rotational torque thereto from said at least one motor through said variable speed drive and said controller, each of said drive shaft portions imparts said independent rotational movements to a respective one of said impeller and said diffuser, wherein said fluid is in a substantially liquid state upon introduction to said impeller.

2. The pump of claim 1, wherein said impeller and said diffuser are in counter-rotating relationship with one another.

3. The pump of claim 1, wherein said at least one motor comprises a dual motor.

4. The pump of claim 1, wherein said at least one motor comprises a single concentric-shaft motor.

5. The pump of claim 1, wherein said received data is stored in memory that makes up a portion of said controller, said memory selected from the group consisting of a lookup table and data structure.

6. The pump of claim 5, wherein said received data is provided from the group consisting of a pump manufacturer and a diagnostic routine the latter of which varies the operation of said pump and detects at least one operational condition associated with the operation of said pump.

7. A pump assembly comprising:
   a single-stage centrifugal pump for a fluid, said pump comprising:
      a housing;
      a single impeller rotatably disposed in said housing such that fluid introduced thereto is centrifugally discharged therefrom to experience a first increase in energy;
      a diffuser rotatably disposed in said housing and placed in radially outward fluid communication with and fluidly downstream of said impeller such that upon passage through said diffuser, said discharged fluid experiences a second increase in energy; and
      a shaft rotatably cooperative with each of said impeller and said diffuser and comprising two-concentrically-arranged drive shaft portions;
   at least one motor rotationally coupled to each of said impeller and said diffuser through said drive shaft portions such that rotational movement imparted to a respective one of each of said impeller and said diffuser is independent of one another; and a controller cooperative with said pump and said at least one motor to regulate operation thereof, said controller configured to receive data corresponding to operation of said pump and to use such data to calculate a combination of speeds to be imparted to said impeller and said diffuser from said shaft in order to achieve an inlet condition for said pump that can provide an optimized specific speed of said pump between 200 and 6000 based on a combination of a best efficiency point and a best net positive suction head required that is selected from a pump characteristic curve in order to adapt to independent rotational movements of said impeller and said diffuser, wherein said fluid is in a substantially liquid state upon introduction to said impeller.

8. The assembly of claim 7, wherein said impeller and said diffuser are in counter-rotating relationship with one another.

9. The assembly of claim 7, wherein said two-concentrically-arranged drive shaft portions comprises an outer shaft portion that is rotatably coupled to said diffuser and an inner shaft portion that is rotatably coupled to said impeller.

10. The assembly of claim 9, wherein said at least one motor comprises a single alternating current induction motor that defines a pair of counter-rotating rotors each cooperative with a respective one of said inner and outer shaft portions.

11. The assembly of claim 9, wherein said at least one motor defines a pair of alternating current induction motors each cooperative with a respective one of said inner and outer shaft portions.

12. The assembly of claim 11, further comprising a transmission rotatably cooperative with a said pair of alternating current induction motors.

13. The assembly of claim 7, wherein said regulated operation of said at least one motor and said pump is based on a plurality of operational criteria.

14. A method of pressurizing a fluid, the method comprising:

introducing a fluid in a substantially liquid state into a single-stage centrifugal pump, said pump comprising:
a housing;
a single impeller rotatably disposed in said housing such that fluid introduced thereto is centrifugally discharged therefrom to experience a first increase in energy;
a diffuser rotatably disposed in said housing and placed in radially outward fluid communication with and fluidly downstream of said impeller; and
a shaft rotatably cooperative with each of said impeller and said diffuser and comprising two-concentrically-arranged drive shaft portions;
a controller configured to receive data corresponding to operation of said pump and to use such data to calculate a combination of speeds to be imparted to said impeller and said diffuser from said variable speed drive in order to achieve an inlet condition for said pump that can provide an optimized specific speed of said pump between 200 and 6000 based on a combination of a best efficiency point and a best net positive suction head required that is selected from a pump characteristic curve in order to adapt to independent rotational movements of said impeller and said diffuser;
using at least one motor to impart rotational torque to said shaft such that rotational movement of a respective one of each of said impeller and said diffuser takes place independent of one another;
operating said pump through said controller; and
discharging said fluid from said pump with a higher energy content than prior to said introducing.

15. The method of claim 14, wherein said at least one motor defines a pair of motors each cooperative with a respective one of said inner and outer shaft portion.

16. The method of claim 14, wherein said two-concentrically-arranged drive shaft portions comprises an outer shaft portion that is rotatably coupled to said diffuser and an inner shaft portion that is rotatably coupled to said impeller that define said shaft.

* * * * *